May 20, 1952 C. E. SEMPOS 2,597,131
CRANBERRY RECOVERY MACHINE
Filed July 17, 1947 3 Sheets-Sheet 1
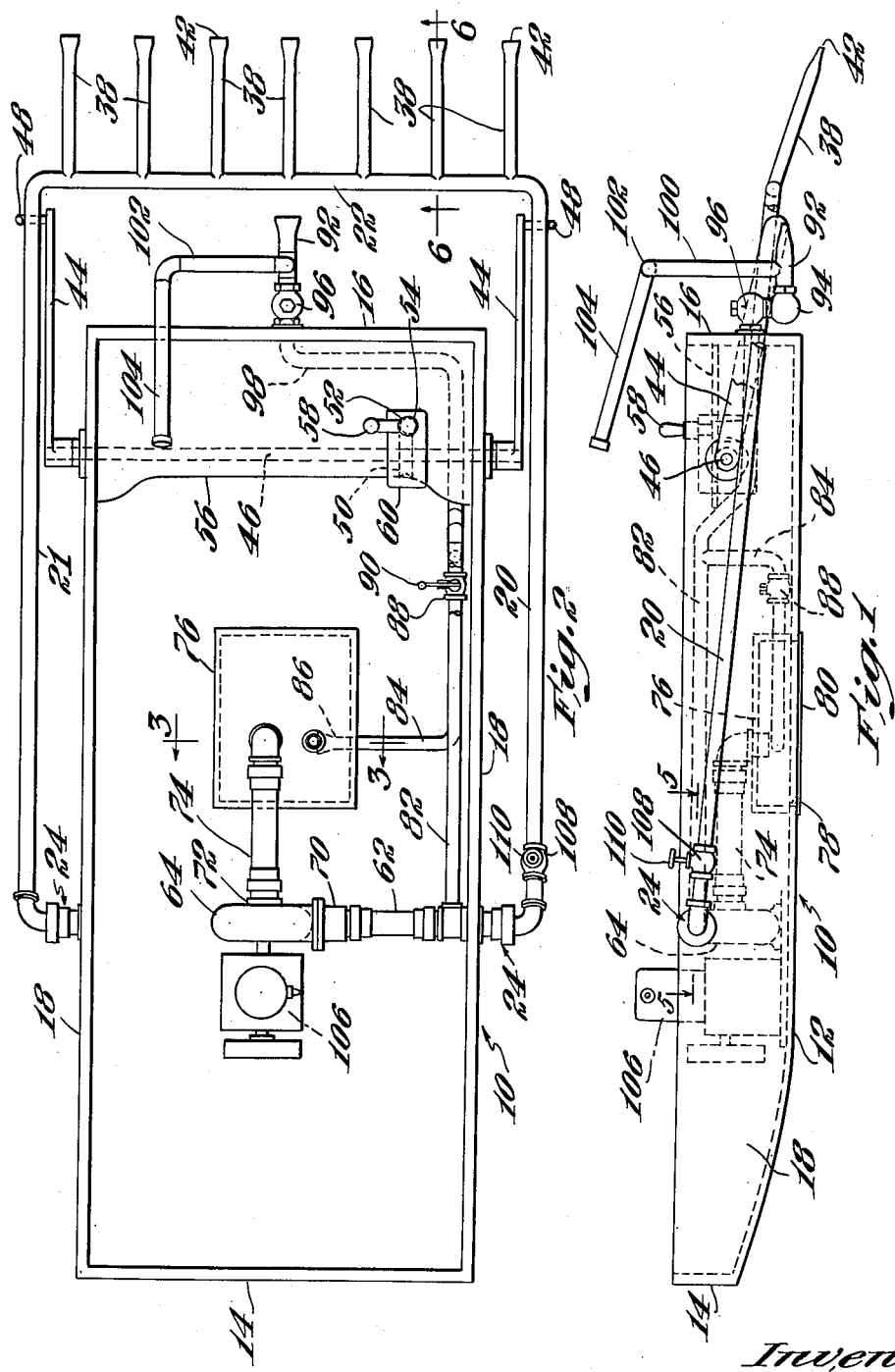
Inventor
Christ E. Sempos
by Roberts, Cushman & Grover
Att'ys.

May 20, 1952        C. E. SEMPOS        2,597,131
CRANBERRY RECOVERY MACHINE
Filed July 17, 1947        3 Sheets—Sheet 2
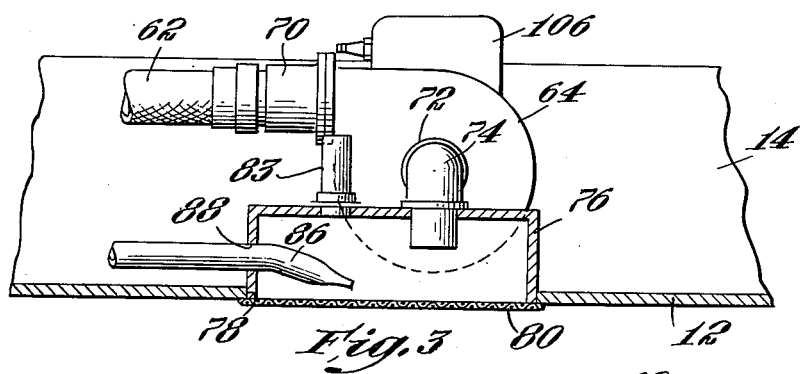
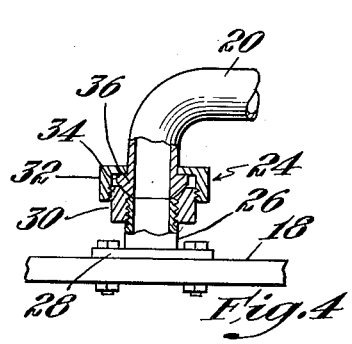
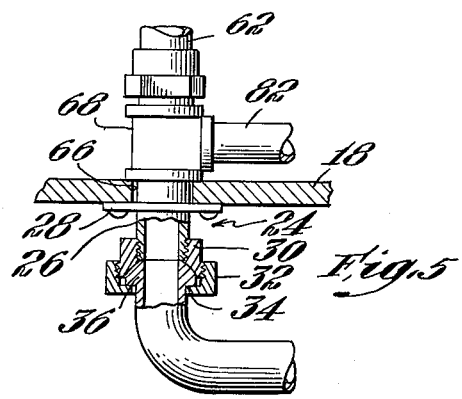
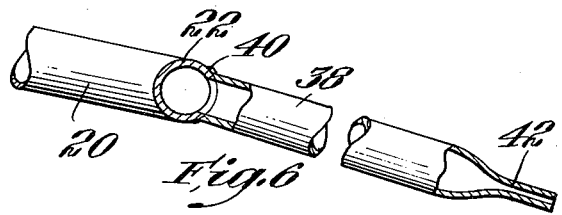
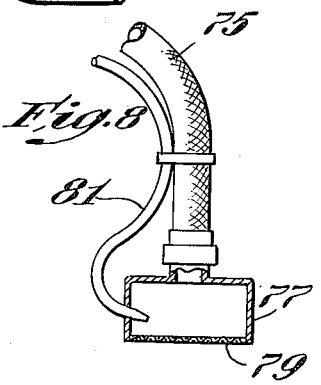
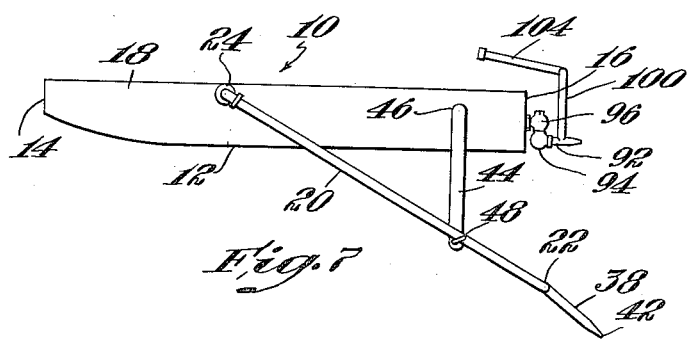
Inventor
Christ E. Sempos
by Roberts, Cushman & Grover
att'ys.

May 20, 1952 — C. E. SEMPOS — 2,597,131
CRANBERRY RECOVERY MACHINE
Filed July 17, 1947 — 3 Sheets-Sheet 3
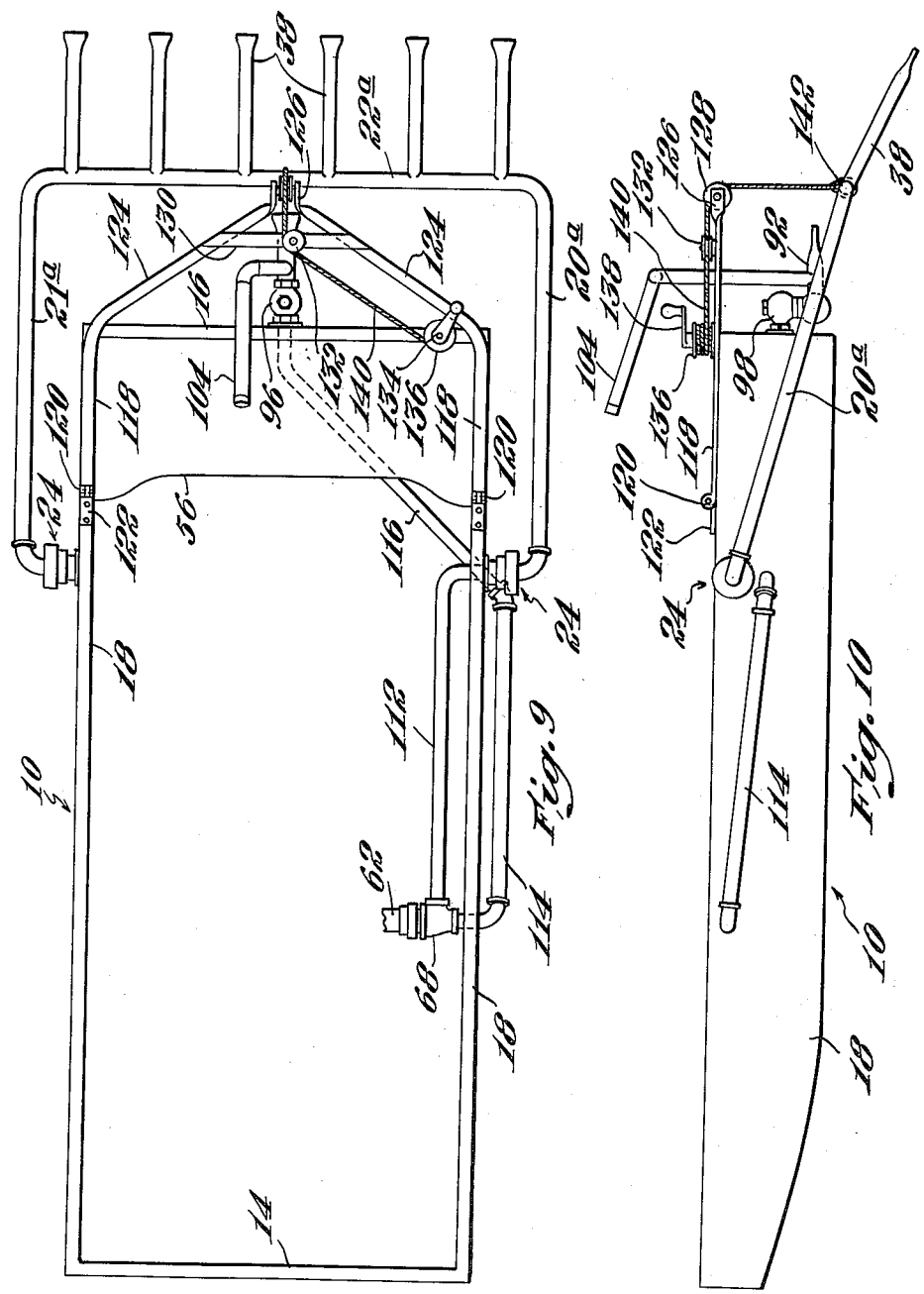
Inventor
Christ E. Sempos
by Roberts, Cushman & Grover
att'ys.

Patented May 20, 1952

2,597,131

UNITED STATES PATENT OFFICE 2,597,131

CRANBERRY RECOVERY MACHINE

Christ E. Sempos, East Wareham, Mass.

Application July 17, 1947, Serial No. 761,551

12 Claims. (Cl. 56—8)

This invention relates to apparatus for and method of harvesting cranberries and more particularly to the recovery of unattached cranberries after the initial harvesting operation.

Ordinarily during the cranberry-picking operations large quantities of berries are dropped and become mixed with leaves and other debris at the bottom of the bog or entangled in the vines themselves. Heretofore some of these have been recovered by flooding the bog whereupon the free berries float to the top and may be skimmed off. There remain, however, a large number of berries which are prevented from floating to the top by reason of entanglement with the vines and with non-floating debris at the bottom of the bog, hence it is an object of this invention to provide apparatus which will release the entangled and imbedded berries from the vines and the bottom and cause them to rise to the top, which is economical to construct, simple in operation, rugged and effective. Preferably, such means could also be self-propelling, easy to guide, adapted to be employed in shallow or deep water and capable of supporting and transporting an operator. Further objects are to provide an apparatus which will release the berries without damaging or uprooting the vines or extensively disturbing the sand at the bottom.

Accordingly, invention resides in one aspect in an apparatus having a mobile, buoyant support on which may be supported, together with an operator, means for agitating the water below the support near the bottom of the bog and, as illustrated, this means includes means immersible in the water to the desired depth and a pump for continuously forcing water therethrough to create turbulence in the water. Specifically the aforesaid may comprise one or more nozzles and to effect a maximum recovery the agitation in the water should be initiated by disturbing it at the bottom of the bog so that eddies and currents rise therefrom to the top thereby exerting a lifting force upon the berries. Preferably a plurality of nozzles having flared discharge ends are employed and they are connected to a manifold extending transversely of one end of the support namely the rear end and spaced therefrom. The manifold consists of a hollow conduit connected at its opposite ends by hollow legs to form a U-shaped frame the frame being pivotally supported by attachment of the ends of the legs to the opposite sides of the support and being swingable downwardly to lower the nozzles into the water. Crank means is mounted on the support and is connected to the legs to effect raising and the lowering of the frame so as to set the nozzles at a predetermined depth. As illustrated, water is delivered to the nozzles through one of the hollow legs, the latter being attached by way of conduits to a pump mounted on the support, the pump being driven by a suitable engine such as a simple, one-cylinder internal combustion engine.

Preferably, the support is a shallow draft scow capable of supporting the combined weight of the apparatus and the operator in very shallow water, the nozzles being swingable from the rear end thereof downwardly and being so constructed as to be effective in water depths of from six inches to three or four feet.

In another aspect the invention resides in an apparatus of the aforementioned character in which the supporting means, that is, the shallow draft scow is propelled in part by the aforesaid nozzles and is guided by an auxiliary nozzle. The auxiliary nozzle which also constitutes the primary propelling means, is in the form of an independent nozzle pivotally supported at the rear end of the scow and water is delivered through this nozzle from the aforesaid pump. As constructed, the nozzle is located above the bottom plane of the scow so as to permit use of the apparatus in very shallow water and a handle is fixed to the nozzle for changing its angular position in a horizontal plane and hence for guiding the scow in its forward movement.

The water for discharge through the agitating and propelling nozzles is drawn into the bottom of the scow through an aperture formed therein, the latter being covered by an inverted intake chamber open to the water. A conductor connects the intake chamber to the suction side of the pump and to prevent debris from gaining access to the pump a metal screen is fastened over the opening in the bottom of the scow. Since the agitation of the water causes leaves and small pieces of the vine to rise, together with the berries, a layer of this may accumulate on the screen which protects the intake chamber and hence interfere with free flow of water to the pump. Accordingly, and as illustrated herein, a by-pass is connected to the discharge side of the pump and is lead by way of a conduit into the aforesaid chamber above the screen. Interposed in the by-pass is a quick-acting valve actuable to initiate a discharge of water through the by-pass and through the screen to blow off the debris accumulated on the underside thereof.

In a modified form of the invention the intake conduit of the pump may be flexible so that it may be put over the side of the scow with its free end immersed in the water. As thus constructed the screen may be attached to the open end of the conduit and a flexible by-pass in the form of a small flexible conduit may be connected between the discharge chamber of the pump and the free end of the intake conduit behind the screen. As heretofore described a quick-acting valve is interposed in the flexible by-pass and is actuable to cause water to be discharged through the by-pass and hence through the screen.

While the apparatus as heretofore described is particularly effective for recovering cranberries from the bottom of a bog which have been detached during the initial harvesting operation and dropped through carelessness to the bottom, where they become embedded and lodged in the sand and debris at the bottom, the invention appertains in another aspect to a method of recovering such unattached berries. This method includes broadly, initiating a disturbance at or near the bottom of the bog to create eddies and currents which ascend toward the top and hence serve to dislodge the berries and lift them to the top whereupon they are skimmed from the surface. The disturbance of the water near the bottom is preferably effected by projecting jets of water under pressure thereinto and this is accomplished by submerging into the water close to the bottom, means through which jets of water may be propelled. Such means may be traversed over the entire bog between the rows of plants.

It has been found that not only does the aforesaid apparatus and method serve to dislodge the berries, thereby to effect a substantial recovery of the same, but that it also loosens and dislodges the debris which ordinarily collects on the bottom of the bog and which consists mainly of leaves, broken vines, etc. which should from time to time be removed from the bog, raising this debris to the top so that it may be easily skimmed off the surface. Many thousands of dollars are spent yearly on cleaning bogs because the accumulation of such debris chokes the vines, retards their growth and productive capacity and, moreover, serves as a shelter for insects which attack the vines and protects them from ordinary spraying operations with insecticide. Accordingly, another important aspect of the present invention lies in loosening, dislodging and floating the unlies desirable debris to the surface by means of the aforesaid method.

The invention will now be described in detail with reference to the accompanying drawings in which Fig. 1 is a side elevation of the apparatus which constitutes the subject-matter of the present invention;

Fig. 2 is a plan view of the apparatus looking down from the top of Fig. 1;

Fig. 3 is a vertical fragmentary section taken on the line 3—3 of Fig. 2 illustrating the details of the intake chamber;

Fig. 4 is a fragmentary plan view partly in section of the connection for the leg at the upper side of the apparatus as shown in Fig. 2;

Fig. 5 is a fragmentary view partly in section on the line 5—5 of Fig. 1;

Fig. 6 is a section on the line 6—6 of Fig. 1;

Fig. 7 shows the apparatus to much smaller scale with the nozzles in operating position for producing agitation in the water at the bottom of the bog;

Fig. 8 shows a modified flexible intake conduit for the pump adapted to be dropped over the side of the scow;

Fig. 9 is a side elevation of an alternative form of the apparatus; and

Fig. 10 is a plan view of the alternative form of the apparatus.

Referring now to Fig. 1, the device is indicated generally at 10 as comprising a shallow draft scow having a bottom 12, ends 14 and 16 and sides 18. Pivotally mounted on this scow is a U-shaped frame consisting of spaced parallel legs 20 and 21 which are formed of hollow pipe joined at their rear ends by a transverse pipe 22. The parts may be jointed or a continuous piece of tubing bent to shape. As thus formed, the frame is pivotally attached to the walls of the scow at 24. Pivotal attachment is provided by means of swivel couplings 26 fastened to the sides 18 by bolts 28 and including threaded portions 30 to which there are secured threaded collars 32 having inwardly directed flanges 34 for retaining enlarged heads 36 at the inner ends of the legs 20 and 21.

To the transversely extending portion 22, Figs. 2 and 6 of the frame, there are secured in spaced relation a plurality of nozzles 38 these being welded to the portion 22 at 40 as indicated in Fig. 6. The nozzles 38 have terminal flared ends 42 and preferably are inclined with respect to the axis of the legs 20 and 21 as indicated in Fig. 6.

The frame is movable about its pivots downwardly with respect to the scow so as to bring the nozzles into close proximity with the bottom of the bog, the most desirable distance therefrom being determined by experiment and, of course, being at a distance which will afford a maximum recovery of the cranberries. To effect the proper disposition of the nozzles and to maintain them at this position there are secured near the rear end of the scow a pair of cranks 44 fixed to the opposite ends of a transversely extending shaft 46, the latter being journaled in the walls 18 of the scow. The free ends of the crank have upwardly opening brackets 48 thereon which cradle the legs 20 and 21 thereby supporting the same. To effect lowering of the frame and also raising thereof, the shaft 46 has fixed thereto a gear 50 which meshes with a gear 52 fixed to the lower end of a vertically disposed shaft 54, the latter extending upwardly through a seat 56 fixed at the rear end of the scow. The upper end of the shaft has fastened thereto a crank and handle 58 by means of which the shaft 52 may be rotated. The gears 50 and 52 preferably are housed within a gear housing 60 located close to the bottom of the scow.

In order to deliver water under pressure to the nozzles 38, the leg 20 is connected to one end of a conduit 62 the opposite end of which is connected to a pump 64 mounted in the scow. The connection between the leg 20 and the conduit 62 is conveniently afforded by extending the coupling 26, Fig. 5, inwardly through an aperture 66 formed in the side wall 18. The inner end of coupling 26 is connected by way of a T-coupling 68 to the conduit 62. The conduit 62 is connected to the discharge side 70 of the pump 64.

The suction side 72 of the pump 64 is connected by way of a conduit 74 to an intake chamber 76 which consists of an inverted box-like structure fixed to the bottom of the scow over an opening 78 therein. To prevent access of dirt, leaves and other debris to the chamber and hence to the pump, a metal screen 80 is secured to the bottom of the scow over the aperture 78. During operation the agitation of the water produced by the nozzles 38 will not only cause the cranberries to rise to the surface but will also cause a considerable amount of the leaves and small twigs broken from the vines to rise from the bottom and these will accumulate on the outer surface of the screen 80 after a little time to such an extent as to seriously impede the passage of water through the screen to the intake chamber and thus the supply of water to the intake side of the pump. It is desirable, therefore, to scavenge or clean this screen 80 at intervals and this is accomplished as follows: A conduit 82 is connected to the T-coupling 68 at the discharge side of the pump 64 and extends rearwardly therefrom toward the rear end of the scow for the purpose which will appear hereinafter. To this conduit 82 there is connected a branch conduit 84 which extends downwardly close to the bottom of the scow and has a nozzle 86 at its end which projects through an opening 88 formed in one wall of the intake chamber 78. As illustrated in Fig. 3, the nozzle 86 is positioned in the intake chamber close to the inner side of the screen 80. Interposed in the conduit 84 is a quick-acting valve 88 having an operating lever 90 close to the bottom of the scow which may conveniently be actuated by the foot of the operator without moving from the seat 56. Actuation of this quick-acting valve will permit water discharged by the pump 64 to pass through the conduit 84 and nozzle 86 to the inside of the chamber 74 and will blow the accumulated debris on the outside of the screen from the screen. This valve may be actuated at intervals to keep the screen clear. A breather tube 83 is fixed into the top of the intake chamber, Fig. 3, to vent any air that may become trapped therein.

In an alternative form of intake rather than having a specially constructed intake which necessitates cutting an aperture in the bottom of the scow and bolting an intake chamber thereover, the intake may take the form of a flexible conduit 75 (Fig. 8) adapted to be dropped over the side of the scow. An intake box 77 having a screened open side 79 may be attached to the free end of the intake conduit and a flexible by-pass 81 may be connected between the discharge chamber of the pump and the box 79 to deliver water to the inside thereof through the screen.

The nozzles 38 not only disturb the water at the bottom of the bog but also afford some propulsion of the scow causing it to move forwardly through the water. The primary propulsion and also guiding of the scow is provided for by an auxiliary nozzle 92 fastened at the rear end of the scow by means of pivoted globe couplings 94 and 96, the latter being fixed to the rear wall 16. As illustrated in Fig. 1, the nozzle is located in a plane above the bottom of the scow so that the apparatus may be used in very shallow water but low enough down so as to be submerged in the water. The upper globe 96 is connected by way of a laterally extending branch conduit 98 to the conduit 82 and therefore furnishes means for supplying water from the pump 64 to the nozzle 92. To guide the scow, the angular position of the nozzle 92 is changed in a horizontal plane by rotation thereof, this being accomplished by means of a vertical post 100 fixed to the nozzle and having at its upper end a lateral extension 102 and an inclined inwardly extending handle portion 104, the handle 104 being located at one end of the seat 56 and above the same for convenience in operation.

The pump 64 may be driven in any suitable manner and, as illustrated herein, there is provided a small one-cylinder internal combustion engine 106 fastened to the bottom of the scow in close proximity to the pump and directly coupled thereto. A shut-off valve 108 may be interposed in the leg 20 through which the water is delivered from the pump 64 and a hand knob 110 is provided therein for closing or opening this valve depending upon whether it is desirable to deliver water to the nozzles 38 or not.

A modified form of the apparatus is illustrated in Figs. 9 and 10, this form being similar in most respects to the previously described apparatus, differing mainly in the means for raising and lowering the nozzle. As illustrated therein, a U-shaped frame similar to that employed above and consisting of the parallel spaced legs 20a and 21a joined by the traverse pipe or bridge piece 22a is pivoted at 24 to the opposite sides 18 of the scow, in this case the pivoted points being located much nearer the rear end 16 of the scow. As shown, the pivots 24 are close to the rear seat 56 and hence the legs 20a and 21a are much shorter in length. The usual nozzles 38 are spaced along the bridge piece 22a. Differing somewhat from the previous apparatus, the water is delivered to the nozzles 38 from the pump by way of a conduit 62 and T-coupling 68 common to the previous apparatus to a pipe 112 connected at one end to the T-coupling and extending rearwardly within the scow to the pivot point 24 of one of the legs 20 where it passes through the side 18 of the scow and is connected to that pivot. Water is delivered to the propelling nozzle 92 by way of a pipe 114 connected at one end to the T-coupling 68, passing out through the side 18 of the scow at this point rearwardly along the side of the scow, and then inwardly through the side at an angle of substantially 45°, as shown at 116, to the rear end of the scow where it is connected to the nozzle 92.

The aforesaid U-shaped frame and nozzles are raised and lowered in contrast to the previous apparatus in the following manner. A bracket in the form of a pair of spaced parallel straps 118 is attached by means of hinges 120 fastened at 122 to the upper edges of the sides 18 of the scow rearwardly of the pivots 24 in such a manner that these straps normally rest on the upper edges of the walls. Extending rearwardly from the straps and formed integrally therewith are inwardly converging arms 124 which project over the rear end of the scow above the bridge piece 22a of the frame and these arms terminate in spaced rearwardly extending flanges 126. Between these flanges 126 is pivotally mounted a pulley 128. Fixed to the top side of the converging arms is a crossbar 130 to the top side of which is pivotally fixed a pulley 132. Pivotally attached to the top edge of the end 16 of the scow is a sheave 134 to which there is attached a crank 138. A cable 140 is fastened at one end to the sheave, passes over the pulleys 132 and 126, and is attached at its other end by means of a loop 142 to the bridge piece 22a. By this arrangement rotation of the crank 138 will raise or lower the nozzles. When it is desired to repair or inspect the nozzles and the propelling means, the aforesaid bracket may be disconnected from the U-shaped frame by detaching the cable, and the whole unit may be tilted upwardly and forwardly to an out-of-the-way position.

In operation of this device the scow is propelled over the surface of the flooded bog as nearly as possible between the spaced rows of cranberry vines by the ejection of water from the propelling nozzle 92, the scow being guided by manipulation of the angular position of the nozzle 92. When the scow is brought into position the operator rotates hand crank 58 or 138, as the case may be, so as to lower the frame and hence the nozzles 38 into the water to the proper depth, this of course depending upon the depth of water. There is sufficient friction in the gears and shafting of the cranks 44 and in the sheave 134 so that when the frame has been lowered to the proper position beneath the scow it will remain supported by the cranks in this position without other locking means. The valve 108 is then opened to admit water from the pump 64 through the nozzles 38 and the operator guides the scow back and forth over the entire bog to stir up the water and hence cause the cranberries to rise to the top. By discharging the jets of water from the nozzles close to the bottom of the bog eddies and currents are started near the bottom and rise through the vines to the top disengaging the berries from the vines and lifting them to the top. This is in marked contrast to prior apparatus wherein violent churning and ebullition of the water was created by beating paddles or blades forced through the water from the top toward the bottom and which by their contact with the vines uprooted and damaged them. The present method is gentle in its action and in no way harms the vines either by breaking them or uprooting them. Moreover, the disturbance is not violent enough to displace the sand at the bottom of the bog and cause it to become mixed with the underlying mud. At intervals to clear the screen which protects the intake chamber, the operator will actuate the quick-acting valve 88 so as to cause a jet of water to be delivered inside of the screen to blow off the accumulated debris.

It is apparent from the construction of the aforesaid apparatus that it may readily be transported from bog to bog with a minimum of difficulty merely by raising the frame and nozzles to a substantially horizontal position, as shown in Fig. 1, and loading the entire apparatus on a truck. If it is desirable, the entire mechanism may be removed from the scow and transported in a truck to another bog and then quickly installed in a similarly constructed scow. The modified form of intake is especially adapted to quick removal of the apparatus from the scow and reassembly on another scow at a distant bog since there is no need for a specially designed scow, that is one having a screened aperture and built in intake in the bottom.

It should be understood that the present disclosure is for the purpose of illustration only and that this invention includes all modifications and equivalents which fall within the scope of the appended claims.

I claim:

1. Apparatus for releasing unattached cranberries from the entangling vines and from the bottom of a flooded bog comprising an elongated support, a hollow frame consisting of parallel legs joined by a bridge piece said legs being pivotally attached to the sides of the support with the bridge piece spaced from and spanning the end thereof, a plurality of nozzles threaded into the bridge piece, crank means mounted on the support and engaging the legs for lowering and raising the frame to submerge the nozzles in the water at a given depth and means on the support for delivering water under pressure to one of said hollow legs.

2. Apparatus for releasing unattached cranberries from the entangling vines from the bottom of a flooded bog comprising an elongated mobile support, a hollow frame consisting of parallel legs joined by a bridge piece, pivotally attached by its legs to the opposite sides of the support to swing downwardly over the end of the support, nozzles fixed in said bridge piece, a pair of crank arms pivotally fastened to said support with the ends engaging the legs, means for rotating the crank arms to lower the legs and hence the nozzles into the water a predetermined amount and means on the support for supplying water under pressure to one of the hollow legs.

3. Apparatus for releasing unattached cranberries from the entangling vines and from the bottom of a flooded bog comprising an elongated mobile support, a hollow frame consisting of parallel legs joined by a bridge piece, said legs being pivotally attached to the sides of the support with the bridge piece spaced from and spanning the end thereof, a plurality of nozzles fixed to the bridge piece, a bracket projecting rearwardly from the support above the frame, a pulley on said bracket, a crank pivotally mounted on the support, a cable fixed at one end to the crank passing over the pulley and fixed at its opposite end to the frame and means on the support for supplying water under pressure to the nozzles.

4. Apparatus for releasing unattached cranberries from the entangling vines and from the bottom of a flooded bog comprising a scow of shallow draft, a frame consisting of hollow parallel legs pivoted at one end to the opposite sides of the scow and connected at their opposite ends by a bridge piece spanning the end of the scow and spaced therefrom, nozzles spaced along the bridge piece, means for lowering the frame on its pivots into the water to a predetermined depth, a pump in the scow having an intake opening in communication with the water, a discharge opening connected to one of the hollow legs and means for actuating the pump.

5. Apparatus for releasing unattached cranberries from the entangling vines and from the bottom of a flooded bog comprising a scow of shallow draft, a frame consisting of hollow parallel legs pivoted at one end to the opposite sides of the scow and connected at their opposite ends by a hollow bridge piece spanning the end of the scow and spaced therefrom, nozzles spaced along the bridge piece, means for lowering the frame about its pivots into the water to a predetermined depth, said scow having an aperture in its bottom, an inverted intake chamber covering said aperture, a screen subtending the aperture and a pump in the scow having its intake side connected to the intake chamber and the discharge connected to one of the legs.

6. Apparatus for releasing unattached cranberries from the entangling vines and from the bottom of a flooded bog comprising a scow of shallow draft, a frame consisting of hollow parallel legs pivoted at one end to the opposite sides of the scow and connected at their opposite ends by a hollow bridge piece spanning the end of the scow and spaced therefrom, nozzles spaced along the bridge piece, means for lowering the frame about its pivots into the water to a predetermined depth, said scow having an aperture in its bottom, an inverted intake chamber covering said aperture, a screen subtending the aperture, a pump in the scow having its intake side connected to the intake chamber and the discharge side connected to one of the legs, and means operable to clear the outside surface of the screen.

7. Apparatus for releasing unattached cranberries from the entangling vines and from the bottom of a flooded bog comprising a mobile, buoyant support, means carried thereby for agitating the water, said means including a nozzle immersible in the water, a pump for continuously forcing a jet of water through the nozzle to produce agitation of the water and to impart forward movement to the support and an independent nozzle movable angularly with respect to the longitudinal dimension of the support from which a jet of water is discharged for guiding the support.

8. Apparatus for releasing unattached cranberries from the entangling vines and from the bottom of a flooded bog comprising a mobile, buoyant support and means carried thereby for simultaneously agitating the water and propelling the support in a forward direction, said means including nozzles immersible in the water and a pump for continuously forcing jets of water through the nozzles and means for changing the angle of one of said nozzles in a horizontal plane to effect guiding of the support in its forward movement.

9. Apparatus for releasing unattached cranberries from the entangling vines and from the bottom of a flooded bog comprising a scow of shallow draft, means carried thereby for agitating the water, said means including nozzles immersible in the water, a pump for continuously forcing jets of water through said nozzles and an independently pivotally mounted nozzle mounted at one end of the scow through which a jet of water may be propelled to impart forward movement to the scow, a pump mounted in the scow, means connecting the pump to the first-named nozzles and to the independently mounted nozzle for forcing jets of water therethrough and a handle fixed to the independently mounted nozzle for rotating it in a horizontal plane to guide the scow.

10. Apparatus for releasing unattached cranberries from the entangling vines and from the bottom of a flooded bog comprising a scow of shallow draft, means carried thereby for agitating the water at the rear end thereof, said means including nozzles immersible in the water, a pump for continuously forcing jets of water through said nozzles, means providing an intake in the bottom of the scow through which water is drawn into the pump, said intake having a screen subtending the same, a by-pass connected to the discharge side of said pump, said by-pass terminating adjacent to the inner side of said screen and a valve in said by-pass actuable to permit discharge of water through said screen.

11. Apparatus for releasing unattached cranberries from the entangling vines and from the bottom of a flooded bog comprising a shallow draft scow, means carried thereby for agitating the water, said means including nozzles immersible in the water, an inverted intake chamber in the bottom of the scow open to the water and subtended by a screen, a pump in the scow, a conduit connecting the intake of said pump to said intake chamber inwardly of said screen, a conduit connecting the discharge side of said pump to said nozzles, a by-pass at the discharge side of said pump connected to said intake chamber behind the screen and a quick acting valve interposed in said by-pass, said valve being actuable to discharge water through the screen from the inside thereof.

12. Apparatus for releasing unattached cranberries from the entangling vines and from the bottom of a flooded bog comprising a shallow draft scow, means carried thereby for agitating the water, said means including nozzles immersible in the water, a pump for continuously forcing jets of water through said nozzles, a flexible intake conduit connected to the intake side of said pump, said flexible conduit being adapted to be dropped over the side of the scow, a screen secured around the open end of the conduit, a by-pass conduit connected at one end to the discharge side of the pump and at its opposite end to the intake conduit adjacent to the inside of the screen and a valve in said by-pass conduit actuable to permit discharge of water through said by-pass conduit.

CHRIST E. SEMPOS.

REFERENCES CITED

The following references are of record in the file of this patent:

UNITED STATES PATENTS

| Number | Name | Date |
| --- | --- | --- |
| 683,775 | Kirkpatrick | Oct. 1, 1901 |
| 1,365,459 | Comina | Jan. 11, 1921 |
| 1,533,644 | Gebhardt | Apr. 14, 1925 |
| 1,571,395 | Clark | Feb. 2, 1926 |
| 1,823,387 | Campbell | Sept. 15, 1931 |
| 1,839,380 | Druppel | Jan. 5, 1932 |
| 1,943,655 | Cummings | Jan. 16, 1934 |
| 2,094,535 | Harrison | Sept. 28, 1937 |
| 2,204,584 | Flower | June 18, 1940 |
| 2,320,283 | Knowlton et al. | May 25, 1943 |
| 2,393,464 | Granberg | Jan. 22, 1946 |